US008973969B1

(12) United States Patent
Potter

(10) Patent No.: US 8,973,969 B1
(45) Date of Patent: Mar. 10, 2015

(54) TONNEAU COVER SYSTEM FOR VEHICLES

(71) Applicant: Dennis Jay Potter, Twin Falls, ID (US)

(72) Inventor: Dennis Jay Potter, Twin Falls, ID (US)

( * ) Notice: Subject to any disclaimer, the term of this patent is extended or adjusted under 35 U.S.C. 154(b) by 0 days.

(21) Appl. No.: 13/707,247

(22) Filed: Dec. 6, 2012

(51) Int. Cl.
*B60P 7/04* (2006.01)

(52) U.S. Cl.
CPC .................................... *B60P 7/04* (2013.01)
USPC ............................. 296/100.18; 296/100.15

(58) Field of Classification Search
CPC ................ B60P 7/00; B60P 7/02; B60P 7/04
USPC ............. 296/100.15–100.18, 136.01, 136.03, 296/136.1, 136.13, 98; 150/154, 166
See application file for complete search history.

(56) References Cited

U.S. PATENT DOCUMENTS

| 578,522 | A | * | 3/1897 | Preusser | 293/43 |
|---|---|---|---|---|---|
| 3,367,347 | A | * | 2/1968 | Smith | 296/100.18 |
| 4,126,351 | A | * | 11/1978 | Peteretti | 296/100.01 |
| 4,639,033 | A | | 1/1987 | Wheatley et al. | |
| 4,647,103 | A | * | 3/1987 | Walblay | 296/100.18 |
| 4,739,528 | A | * | 4/1988 | Allen | 5/119 |
| 4,792,179 | A | | 12/1988 | Stevens | |
| 4,848,828 | A | * | 7/1989 | Hunt | 296/100.15 |
| 4,948,191 | A | * | 8/1990 | Cao | 296/95.1 |
| 5,121,960 | A | | 6/1992 | Wheatley | |
| 5,251,951 | A | | 10/1993 | Wheatley | |
| 5,275,458 | A | | 1/1994 | Barben et al. | |
| 5,431,474 | A | * | 7/1995 | Burkey | 296/100.15 |
| 5,472,256 | A | | 12/1995 | Tucker | |
| 5,540,475 | A | | 7/1996 | Kersting et al. | |
| 5,655,808 | A | | 8/1997 | Wheatley | |
| 5,860,691 | A | | 1/1999 | Thomsen et al. | |
| 6,224,139 | B1 | * | 5/2001 | Weyand | 296/100.16 |
| 6,527,318 | B2 | * | 3/2003 | Kolper | 293/126 |
| 6,619,719 | B1 | * | 9/2003 | Wheatley | 296/100.15 |
| 7,384,090 | B1 | * | 6/2008 | Weldy | 296/100.16 |
| 7,604,282 | B2 | | 10/2009 | Spencer et al. | |
| 7,621,582 | B2 | | 11/2009 | Schmeichel et al. | |
| RE41,078 | E | | 1/2010 | Schmeichel | |
| 7,735,881 | B2 | | 6/2010 | Steffens et al. | |
| 7,815,239 | B1 | | 10/2010 | Schmeichel et al. | |
| 7,828,361 | B1 | * | 11/2010 | Spencer | 296/98 |
| 7,905,536 | B2 | * | 3/2011 | Yue | 296/100.07 |
| 7,954,876 | B2 | * | 6/2011 | Kosinski | 296/98 |
| 7,963,585 | B2 | | 6/2011 | Jones et al. | |
| 2007/0057528 | A1 | * | 3/2007 | Fox et al. | 296/100.16 |

* cited by examiner

*Primary Examiner* — Gregory Blankenship
(74) *Attorney, Agent, or Firm* — Clayton, Howarth & Cannon, P.C.

(57) ABSTRACT

A tonneau cover system for a cargo area of a vehicle. The system may comprise a flexible cover mounted to a main support frame. The flexible cover may include a folded portion such that the cover is operable between a collapsed position and an expanded position. In the collapsed position, the flexible cover is substantially planar, in the expanded position, the flexible cover is able to cover loads taller than the sidewalls of the vehicle cargo area.

21 Claims, 20 Drawing Sheets

TONNEAU COVER SYSTEM FOR VEHICLES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to cover systems for cargo areas of vehicles, and more particularly, but not necessarily entirely, to tonneau cover systems for vehicles.

2. Description of Related Art

Vehicle and trailer manufacturers supply various models of trailers and vehicles that have open beds on which to place cargo for transit. Such vehicle and trailer beds typically have limited or no method of protecting cargo from the weather, water or debris. Furthermore, such vehicle and trailer beds typically have a limited or no method of securing cargo from movement.

Originally if cargo needed to be protected from the weather, water or debris it was covered with a waterproof tarp. However, tarp users objected to the bulky and awkward to handle nature of tarps. Tarps can come loose at high speeds and flap away from the cargo they protect, thereby allowing the cargo to come in contact with the weather, water or debris. Additionally, the cargo and tarps had to be secured using separate strapping, cords or rope, which can be equally awkward to handle.

Thereafter, several types of vehicle bed enclosures were designed to cover the bed in such a way that small cargo could be protected from the weather. U.S. Pat. No. 7,963,585 to Jones discloses a tonneau cover system which can cover the vehicle bed. However, this tonneau cover limits the size of cargo that can be protected from the weather. Cargo larger than the height of the vehicle or trailer bed walls cannot be transported while this tonneau system is in use.

U.S. Pat. No. 7,828,361 to Spencer discloses a tonneau cover that is of expensive construction, with many specially manufactured parts and is limited in its ability to keep water and weather off the cargo. Furthermore, this design uses a hook and loop fastener to secure the tonneau fabric to the frame. Over time, this hook and loop fastening system will lose its ability to fasten the tonneau fabric to the frame. Additionally, this hook and loop fastening systems does not adequately keep water from entering the cargo bed. When a vehicle or trailer is traveling at high speeds, air pressure will force water to migrate through the hook and loop fastening system into the covered vehicle bed thusly, exposing the cargo to moisture.

U.S. Pat. No. 7,604,282 B2 to Spencer shows a tonneau cover rail system that is used to attach the tonneau cover to a truck bed wall. Unfortunately, this tonneau cover rail system protrudes into the cargo space of the vehicle bed and limits the vehicles cargo storage capacity.

U.S. Pat. RE41,078 to Schmeichel discloses a tonneau cover tension adjuster apparatus. However, this design incorporates a complicated and expensive construction tonneau cover tension adjuster which is prone to mechanical failure. Additionally, this design requires manual adjustment to the proper tension.

Several other types of tonneau systems and cargo covers have been proposed—for example, U.S. Pat. No. 7,735,881 to Steffens, U.S. Pat. No. 7,621,582 to Schmeichel, U.S. Pat. No. 7,815,239 to Schmeichel, and U.S. Pat. No. 7,905,536 to Yue. Although all these designs have unique attributes, all tonneau covers hereto known suffer from a number of disadvantages and short comings:

(a) the fastening systems and methods used to connect the tonneau cover rail system to the bed are not adequate to keep moisture from entering the covered cargo space;

(b) the fastening systems and methods used to connect the tonneau cover to rail system itself are not adequate to keep moisture from entering the covered bed cargo space. Additionally, the fastening systems wear with use and allow water to migrate into the bed cargo space;

(c) existing tonneau covers systems cannot expand to cover loads larger than the height of vehicle or trailer bed walls;

(d) no tonneau product exists that can secure cargo from movement; and (e) existing tonneau covers do not self-retract and tension to a flat position after a large cargo load has been removed.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
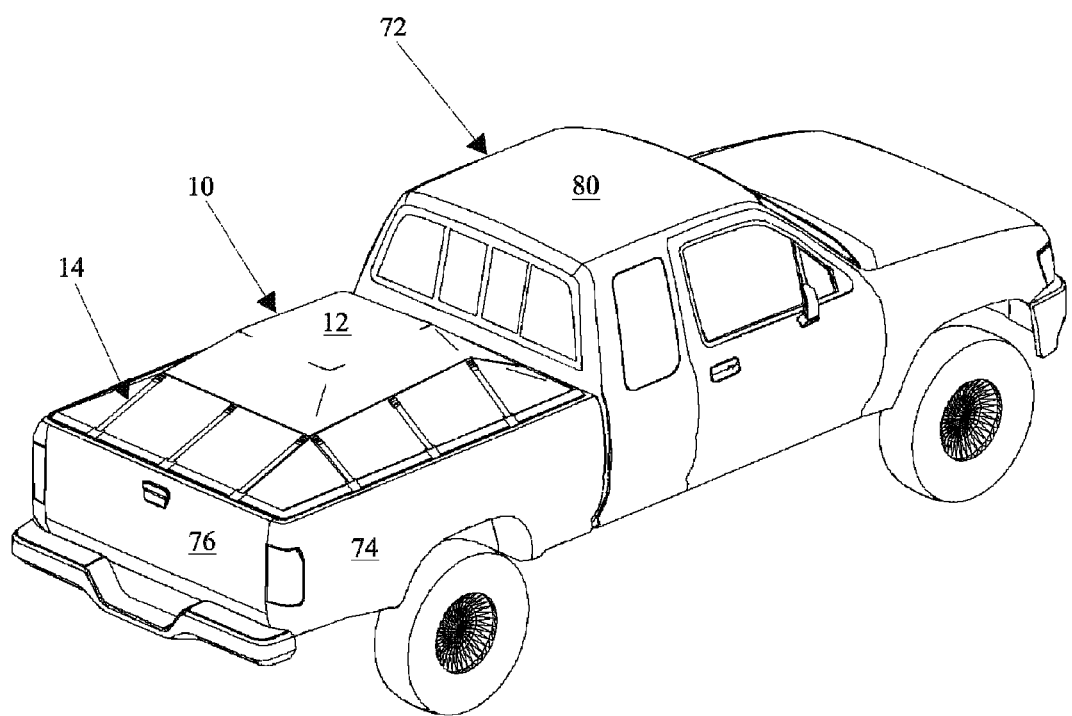
FIG. 1 shows an isometric view of a vehicle utilizing one embodiment of a tonneau cover expanded to fit over and restrain cargo within a vehicle bed.

For the purposes of promoting and understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Figure 2:
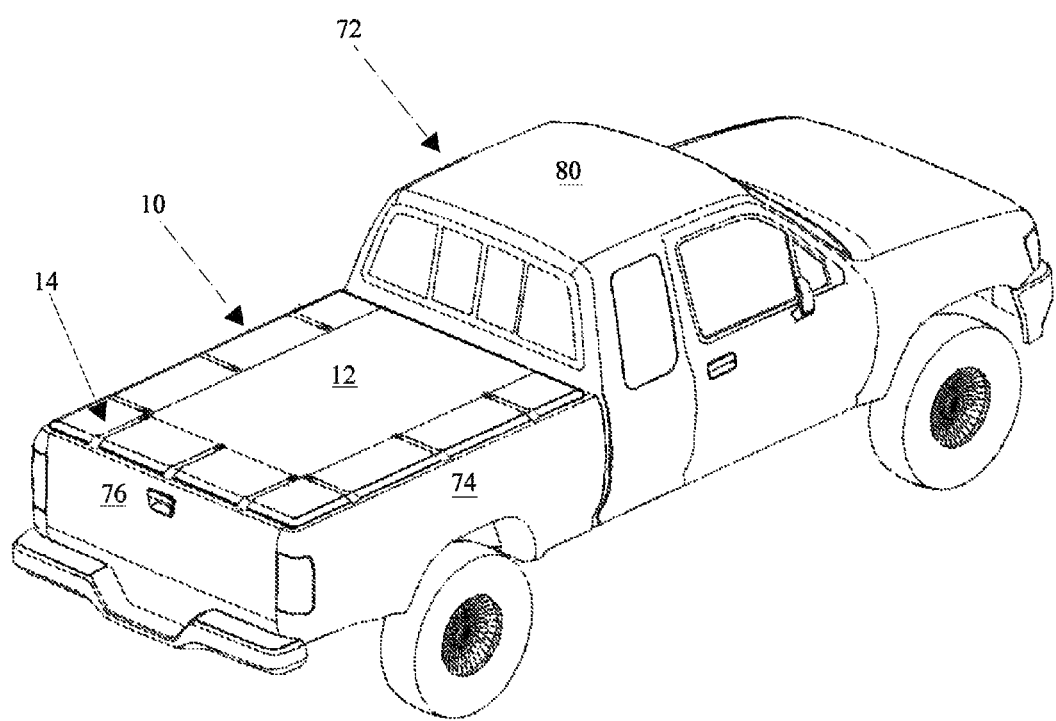
FIG. 2 shows an isometric view of a vehicle utilizing one embodiment of a tonneau cover collapsed and flat over a vehicle bed.

For description purposes herein, the terms "over", "under", "top", "bottom", "front", "rear", "left", "right" relate generally to the embodiment as oriented in FIGS. 1 and 2. It is understood that embodiments of the present invention may assume other various alternative orientations and sequences except where expressly specified to the contrary. Additionally, it is to be understood that the specific details and processes illustrated in the drawings and described in the specifications are simple exemplary embodiments. Hence, specific dimensions, other physical characteristics and materials relating to the embodiments disclosed herein are not to be considered as limiting, unless the claims expressly state otherwise.

Figure 3:
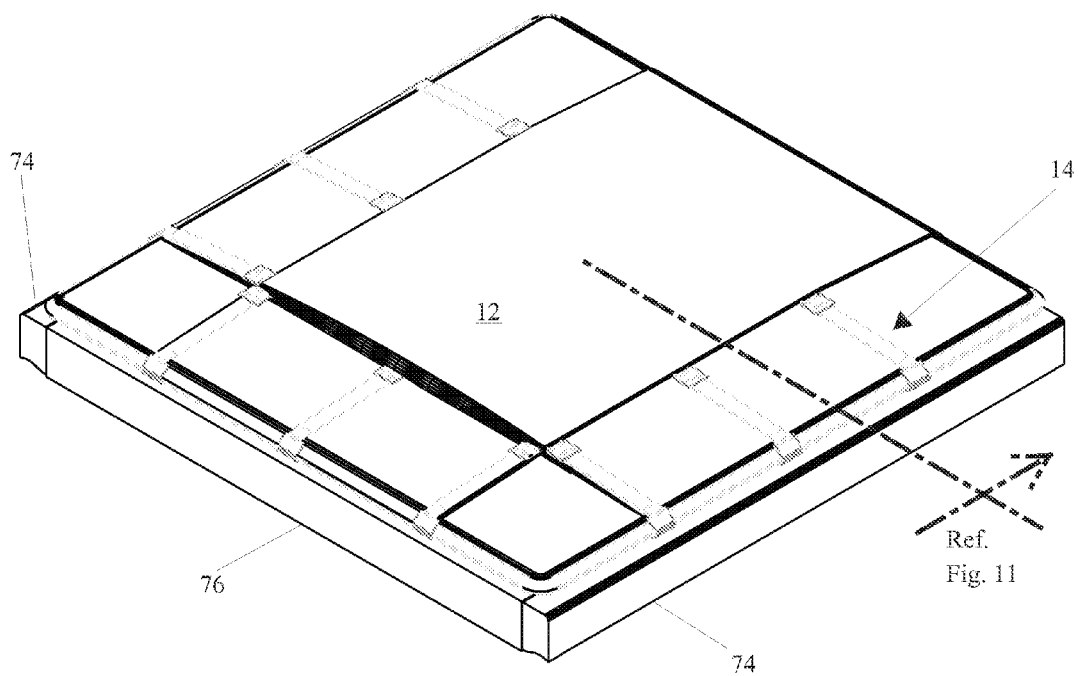
FIG. 3 shows an isometric view of the tonneau cover with components.

Referring now to FIGS. 1, 2, and 3, a water resistant tonneau cover system 10 having a flexible cover 12 is shown according to an embodiment of the present disclosure. The flexible cover 12 fits over and attaches to the top length of opposing vehicle cargo bed side walls 74. The flexible cover 12 fits the width of the vehicle cargo gate 76 and width of the vehicle cab cargo bed wall nearest the vehicle cab 80 covering the opening of the vehicle cargo bed (not shown) of a vehicle 72. In an embodiment, the flexible cover 12 is made of a material that is flexible, resilient, durable and water resistant.

In an embodiment, an exterior strap system 14 allows the flexible cover 12 to be manually tightened to prevent cargo from moving during transit. In addition, the exterior strap system 14 allows the flexible cover 12 to be operable between a collapsed position and an expanded position. In particular, as shown in FIG. 1, the flexible cover 12 may be expanded to cover and restrain cargo that is taller than the vehicle cargo bed side walls 74.

In FIG. 2, the flexible cover 12 may be collapsed flat with an empty vehicle cargo bed. Thus, it will be appreciated that the flexible cover 12 is operable between an expanded position as shown in FIG. 1 and a collapsed position as shown in FIG. 2. In FIG. 1, the exterior strap system 14 may be loosened to allow the flexible cover 12 to unfold to the expanded position. In FIG. 2, the exterior strap system 14 may be tightened to allow the flexible over 12 to fold to the collapsed position.

Figure 4:
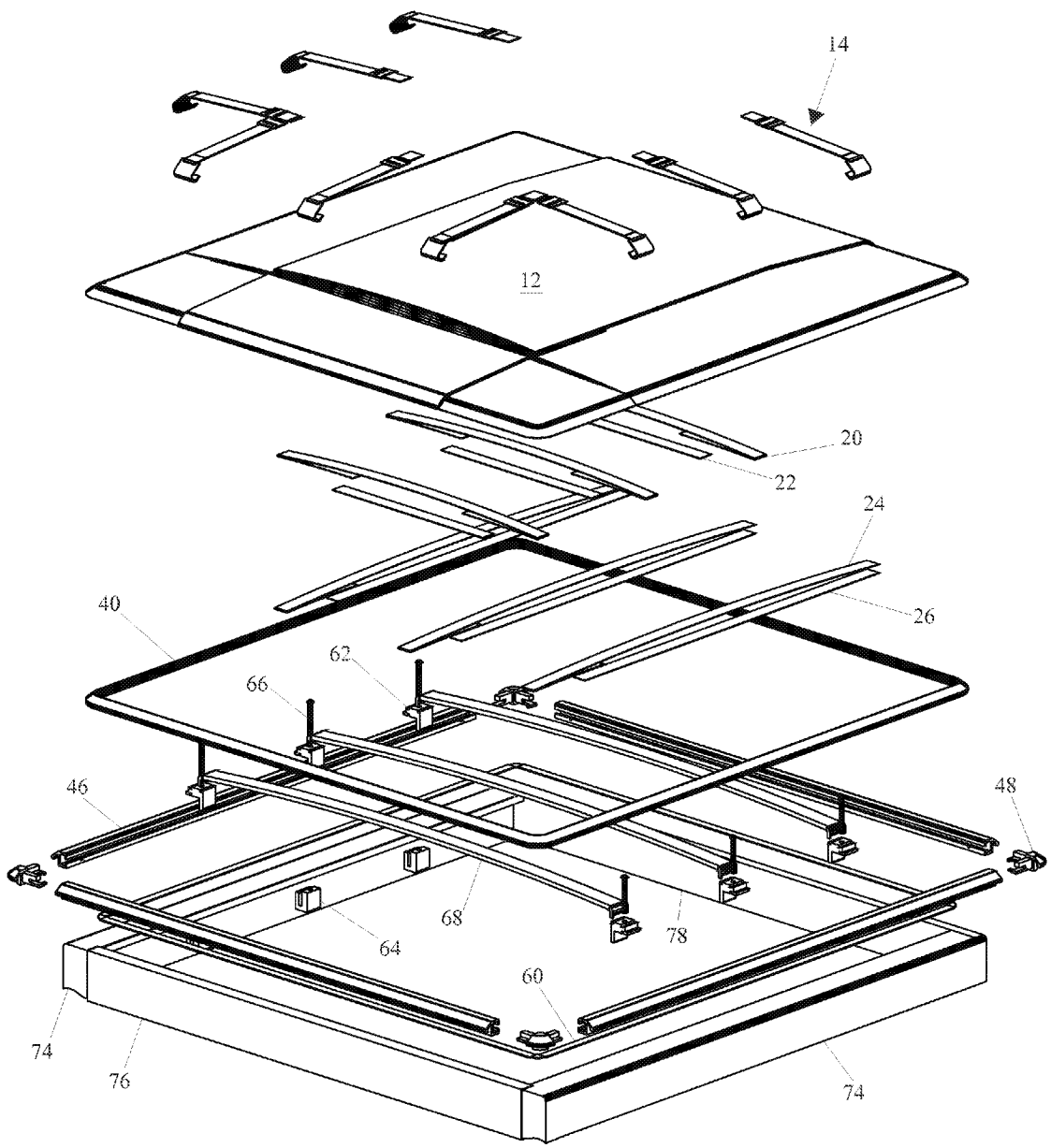
FIG. 4 shows an exploded isometric view of the components of the tonneau cover system.
Figure 5:
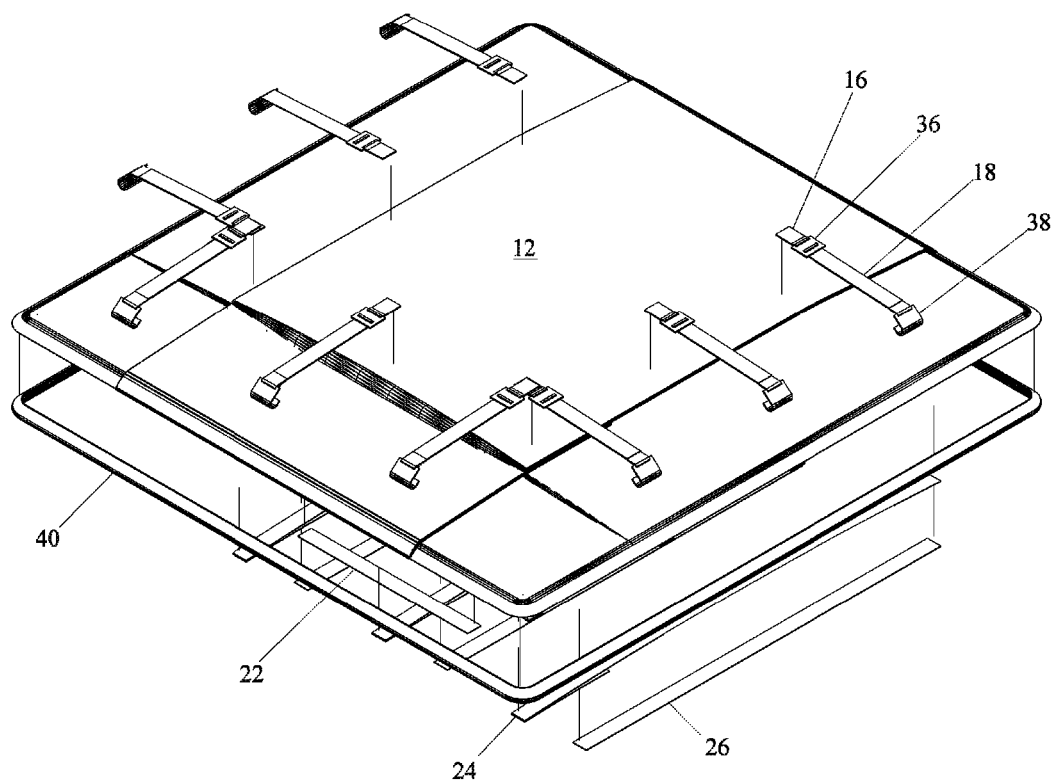
FIG. 5 shows an exploded isometric topside view of the components of the tonneau cover.
Figure 6:
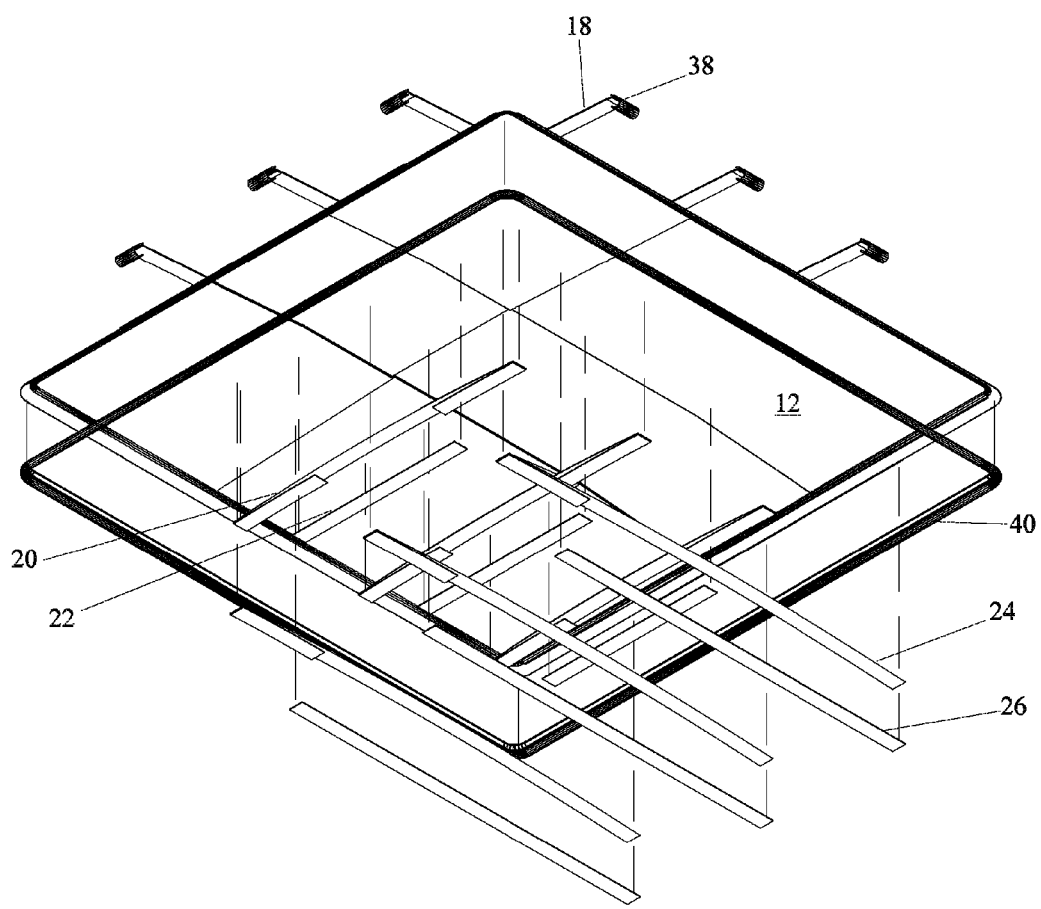
FIG. 6 shows an exploded isometric bottom-side view of the components of the tonneau cover.

Referring to FIGS. 4, 5 and 6, the exterior strap system 14 comprises a plurality of attachment straps 16 attached to the flexible cover 12. The attachment straps 16 may provide an attachment point to the flexible cover 12 for the non-working end of buckles 36. Looped through the working end of the buckles 36 are tightening straps 18 with flat hooks 38 attached at the ends. The hooks 38 may be secured to a side rail as will be explained in more detail below.

In an embodiment, the exterior strap system 14 may be manually expanded to cover cargo that may be taller than the vehicle cargo bed sidewalls 74 (see FIG. 1). The exterior strap system 14 may also be manually tightened to cinch down and restrain cargo that may be taller than the vehicle cargo bed sidewalls 74.

In an embodiment, latitudinal reinforcing straps 20 and longitudinal reinforcing straps 24 are attached to the underside of, and provide support to, the flexible cover 12. In an embodiment, latitudinal elastic tightening straps 22 and longitudinal elastic tightening straps 24 are attached, at specific locations to the flexible cover 12, in a manner that allows the tonneau cover system 10 to self-tension the flexible cover 12 over cargo that may be taller than vehicle cargo bed sidewalls 74.

That is, upon removal of cargo that may be taller than vehicle cargo bed side walls 74, the latitudinal elastic tightening straps 22 and longitudinal elastic tightening straps 26 self-tension and the attached flexible cover 12 collapses to a flat configuration.

Figure 11:
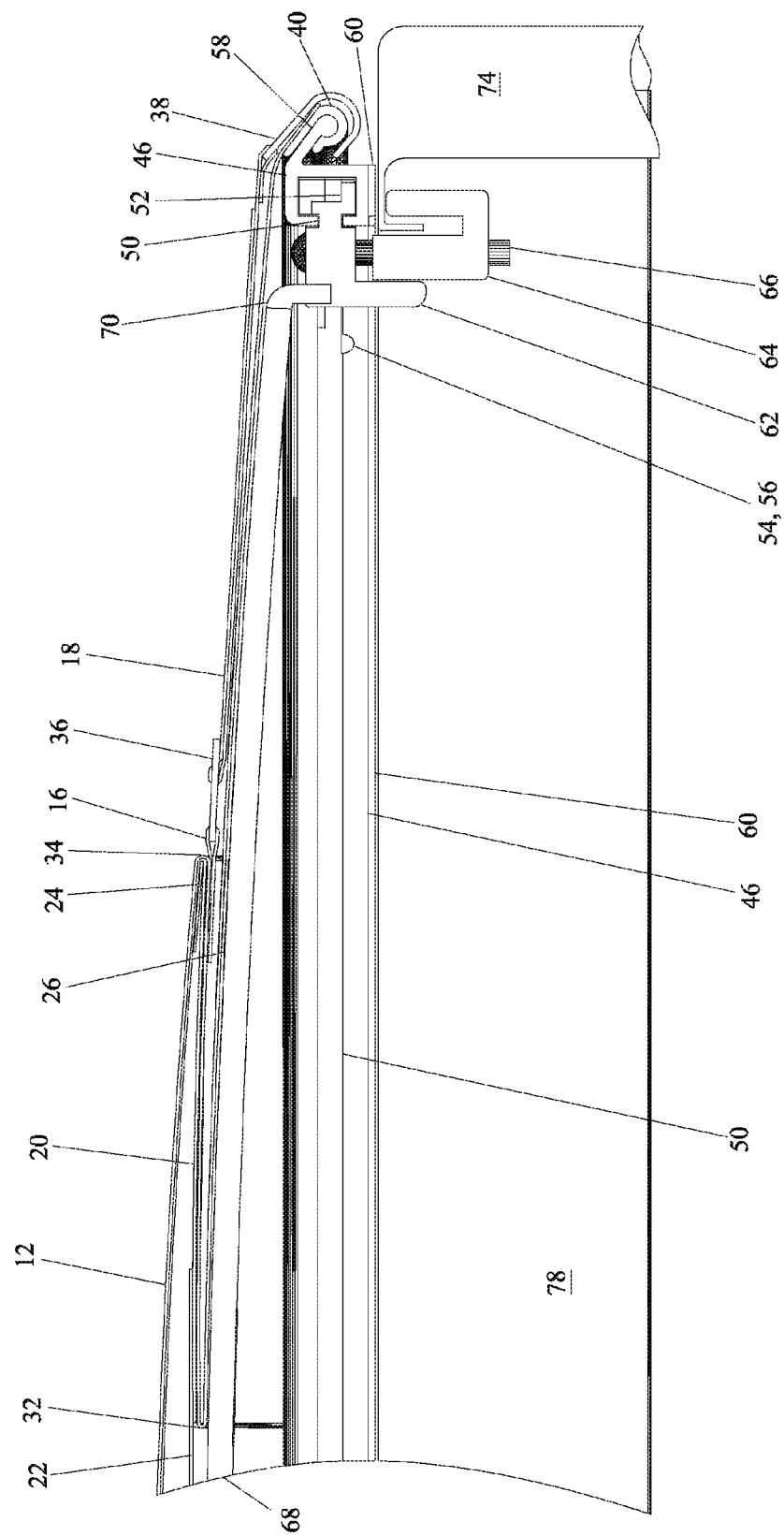
FIGS. 11A-11C show a longitudinal cross section of the components of the tonneau cover system.
Figure 11:
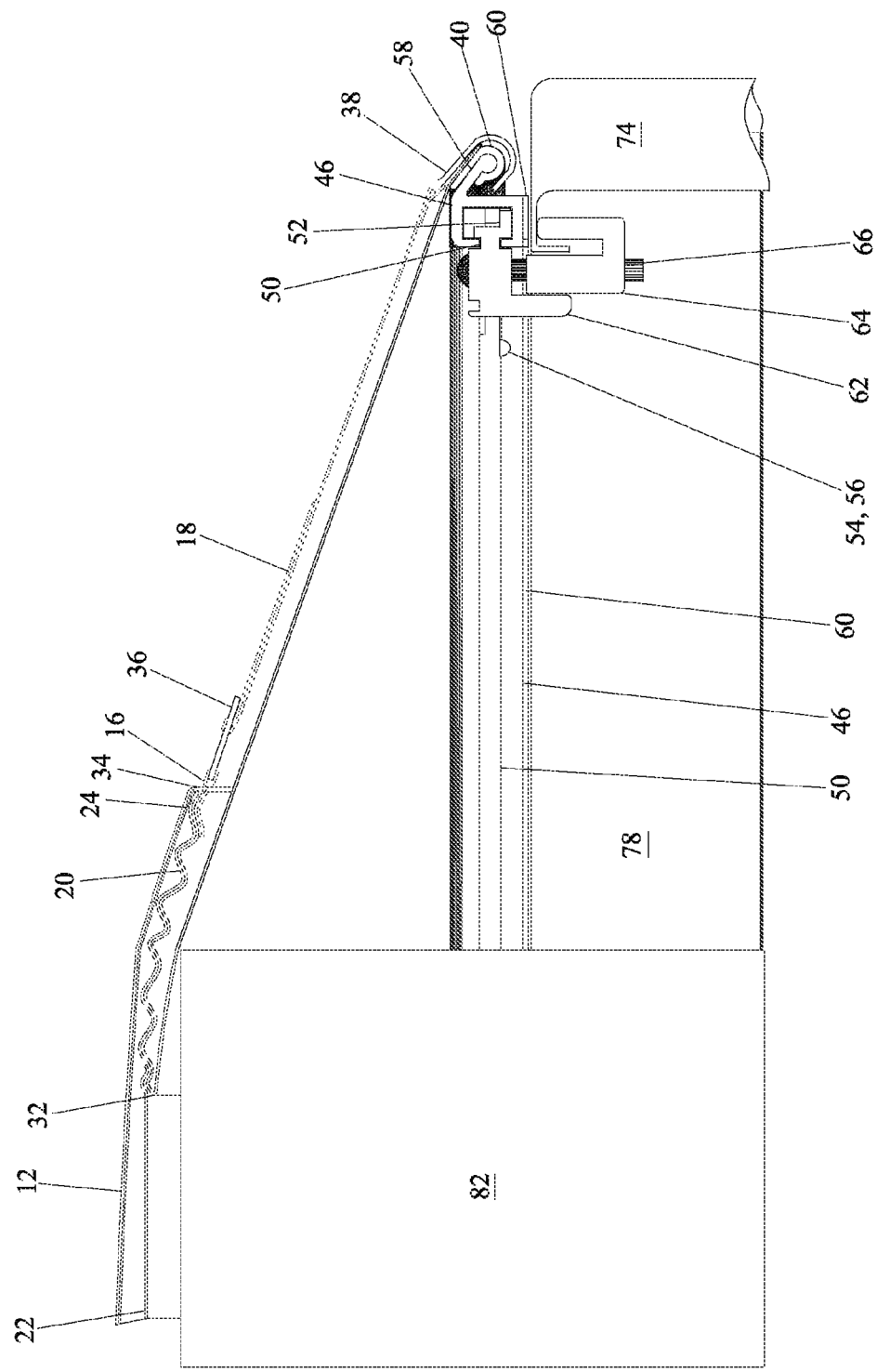
Figure 11:
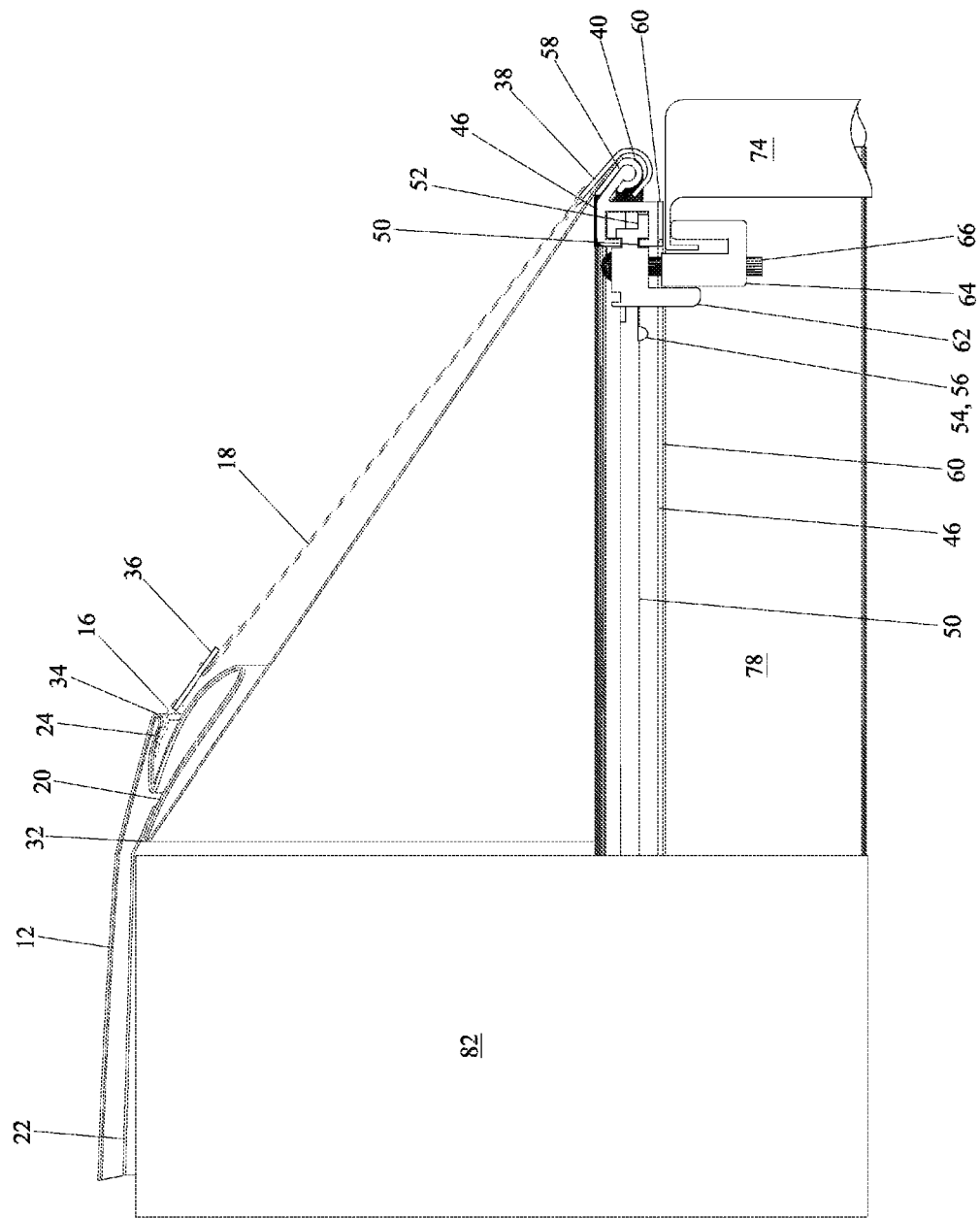

In an embodiment, attached around the perimeter of the flexible cover 12 is a friction fit seal 40 which acts to hold the tonneau cover to the rail frame 46 and rail frame corners 48, illustrated in FIG. 11A, and provide a weather, water and debris tight seal for the cargo.

Figure 7:
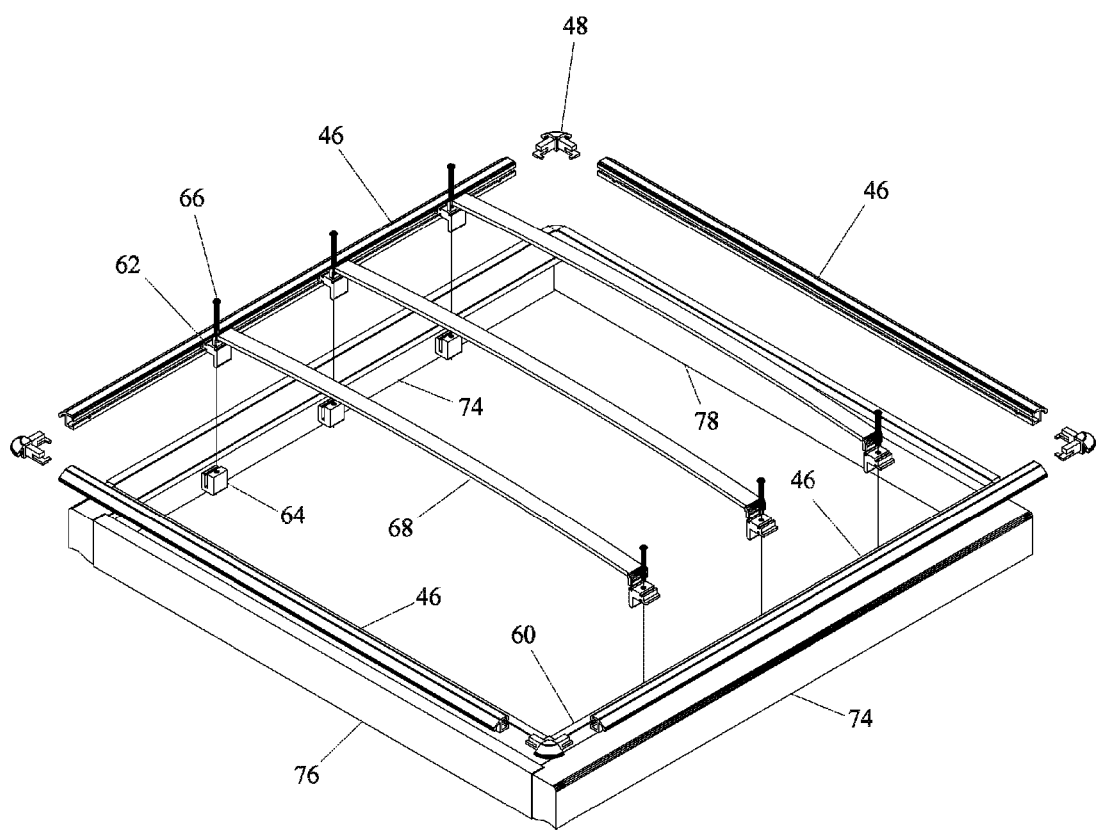
FIG. 7 shows an exploded isometric view of the components of the tonneau cover rail frame and bow system.

FIG. 7 illustrates, according to an embodiment of the present disclosure, how the flexible cover 12 of the tonneau cover system 10 attaches to a vehicle by use of an opposing set of rail frames 46 which are attached to the top of, and run the length of, the vehicle cargo bed sidewalls 74. Another opposing set of rail frames 46, run the width of the vehicle cargo gate 76 and vehicle cab cargo bed wall 78. The rail frames 46 connect to each other by way of rail frame corners 48.

In an embodiment, the rail frames 46 and rail frame corners 48 connect to the vehicle cargo bed sidewalls 74 using a set of upper clamps 62 and lower clamps 64 with socket screws 66. The lower clamps 64 are cored and tapped to receive the socket screws 66. The upper clamps 62 are cored to allow the socket screws 66 to pass through in order to thread into the lower clamps 64. Upon tightening socket screws 66, the lower clamps 64 act as a vice and move toward the upper clamps 62.

Figure 8:
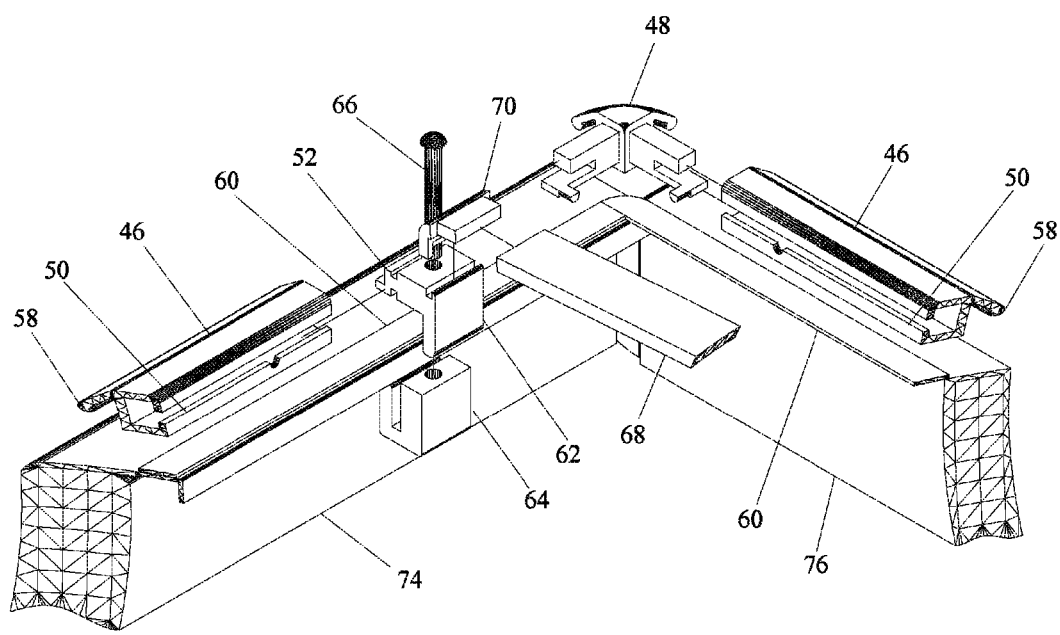
FIG. 8 shows the unattached components of the rail frame, rail frame corners and bow system.

Referring now to FIG. 8, the upper clamp's 62 rail frame attachment 52 slides into the rail frame's 46 upper clamp receiver 50. Upon tightening the socket screw 66, the upper clamp's 62 rail frame attachment 52 pushes down and clamps rail frame 46 onto the top of the vehicle cargo bed side walls 74, sandwiching and compressing gasket 60.

In an embodiment, bow ends 70 attach to the bows 68. The bow ends 70, with bows 68 attached, can slide down onto, and are received by, upper clamp 62. When no cargo is present to be carried by the vehicle 80, the assembled bows 68 and bow ends 70 may be installed onto upper clamp 62. When installed, bows 68 and bow ends 70 provide a structure that allows water, dust and debris to shed off the tonneau system 10.

Figure 9:
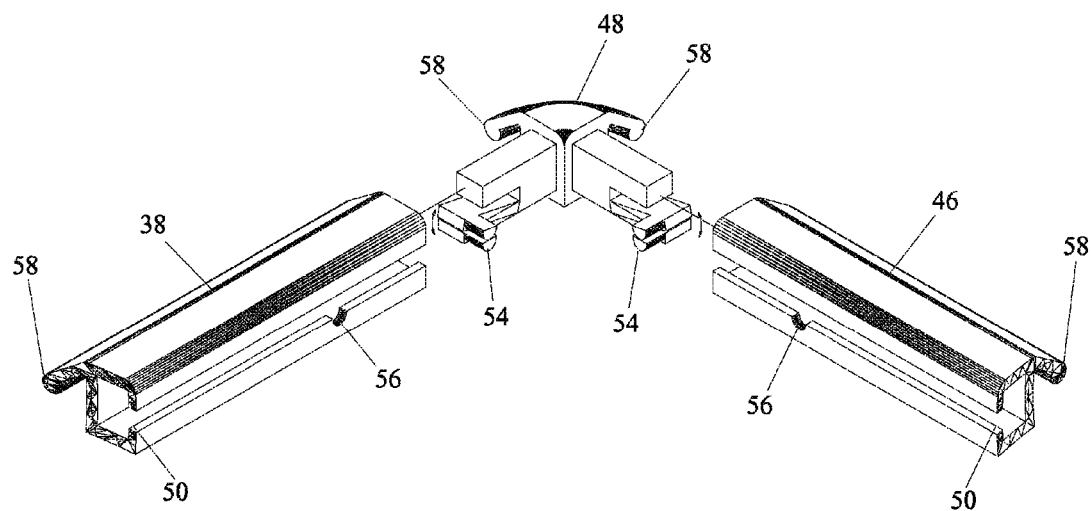
FIG. 9 shows the unattached components of the rail frame, rail frame corners and lift locks.
Figure 10:
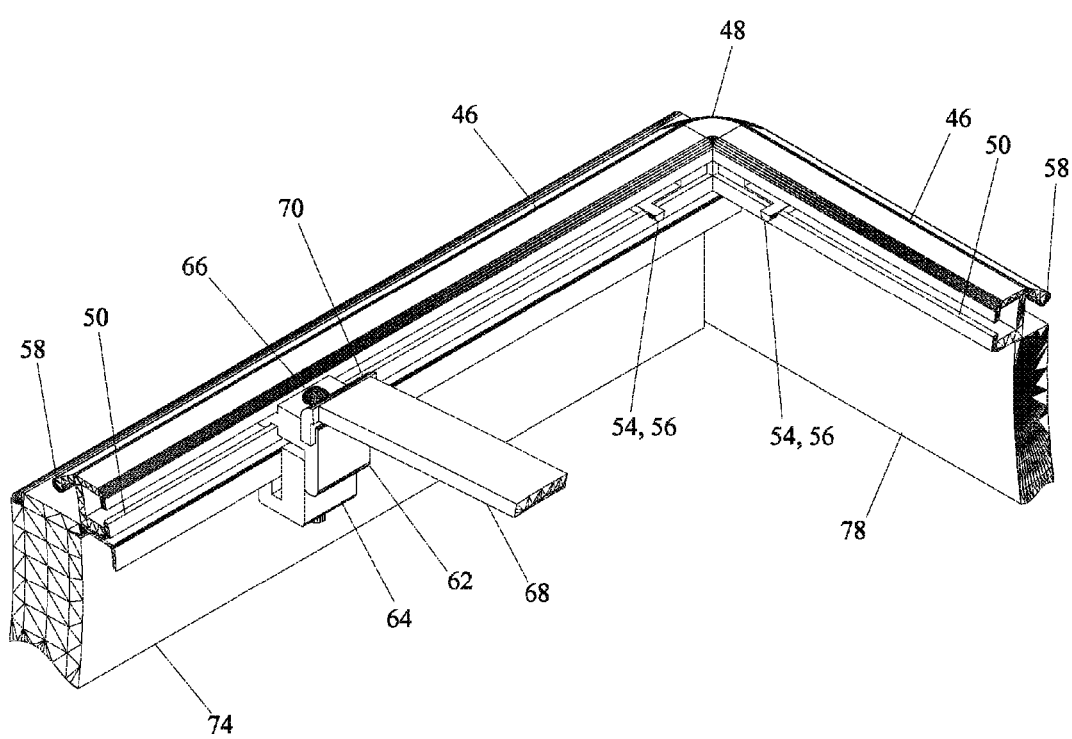
FIG. 10 shows the attached components of the rail frame, rail frame corners and bow system.

Referring now to FIGS. 9 and 10, there is illustrated the rail frame corners 48 attaching to and locking by way of lift locks 54 into rail frame receivers 56 of rail frames 46. In an embodiment, the rail frame corners 48 are made of sufficiently rigid yet flexible material that allows the lift locks 54 to be lifted. To assemble, the lift locks 54 are lifted to slide the rail corners 48 into rail frames 46. Once the rail corners 48 are slid into place, the lift locks 54 return to their normal flat position resting into lift lock receiver 56.

Referring to FIG. 11A-11C, there is shown a latitudinal cross section of the complete tonneau system 10 attached to the vehicle cargo bed side wall 74 and vehicle cab cargo bed wall 78 with bows 68 and bow ends 70 installed. FIG. 11A depicts the tonneau system 10 with the flexible cover 12 in a collapsed position. FIG. 11B depicts the tonneau system 10 with the flexible cover 12 in a partially unfolded to an expanded position when a cargo 82 is placed in the cargo area. FIG. 11C depicts the tonneau system 10 with the flexible cover 12 in an unfolded to a fully expanded position when the cargo 82 is placed in the cargo area.

In an embodiment, the socket screws 66 are partially tightened in order to demonstrate the gasket 60 in an uncompressed state between rail frames 46 and vehicle cargo bed side wall 74. The flat hooks 38 are shown manually tightened to the friction fit seal 40 and friction fit male adapter 58 by manually tightening the manual tightening strap 18. The manual tightening strap 18 may provide manual tension to flexible cover 12.

Figure 12:
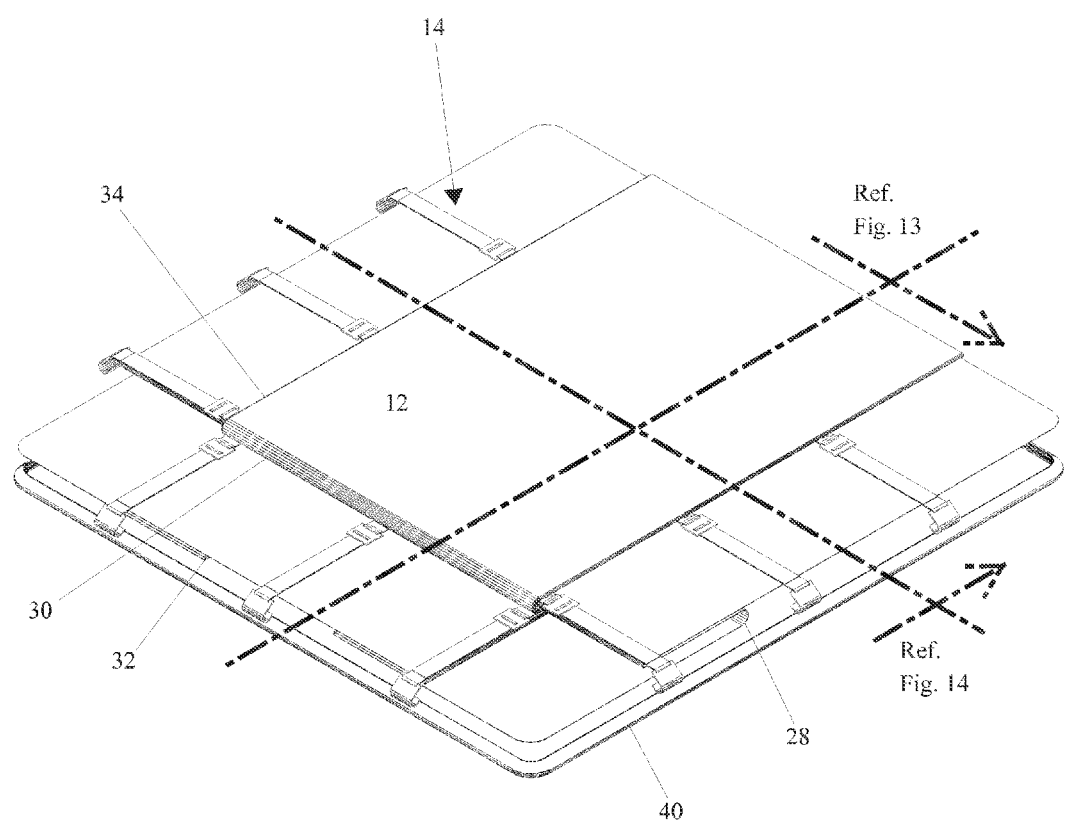
FIG. 12 shows an isometric view of a flat tonneau cover without the friction fit seal attached.

Referring now to FIG. 12, there is illustrated the flexible cover 12 in a collapsed position without the support of the bows 68. The friction fit seal 40 is shown detached for clarity. Internal latitudinal folds 28, external latitudinal folds 30, internal longitudinal folds 32 and external longitudinal folds 34 are incorporated to allow the flexible cover 12 to unfold to an expanded position when cargo is taller than the vehicle cargo bed side walls 74.

Figure 13:
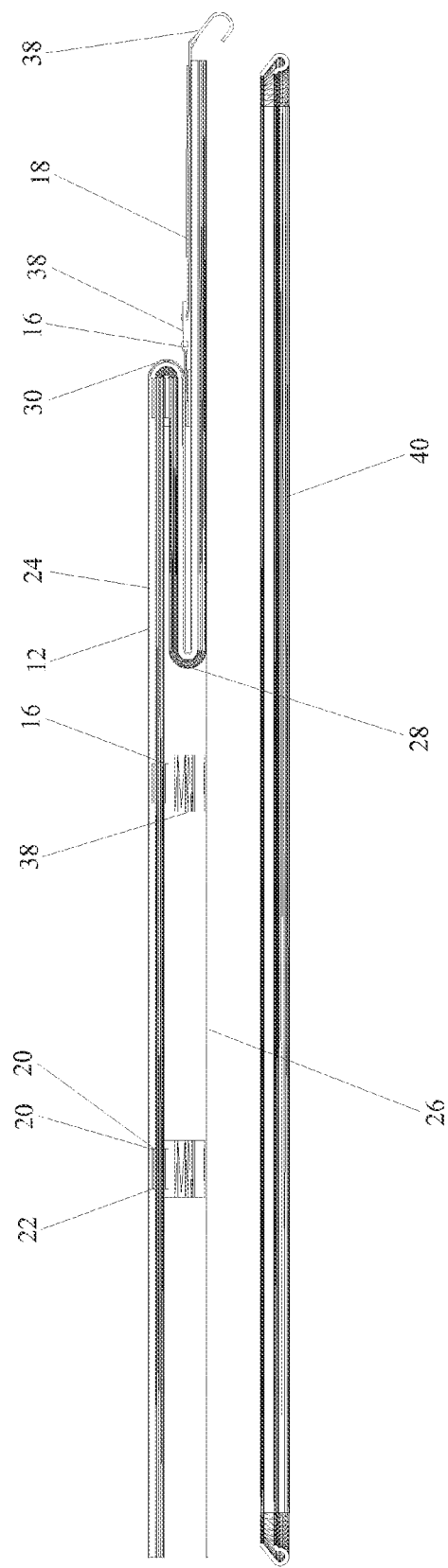
FIG. 13 shows a longitudinal side view of the tonneau cover folds without the friction fit seal attached.
Figure 14:
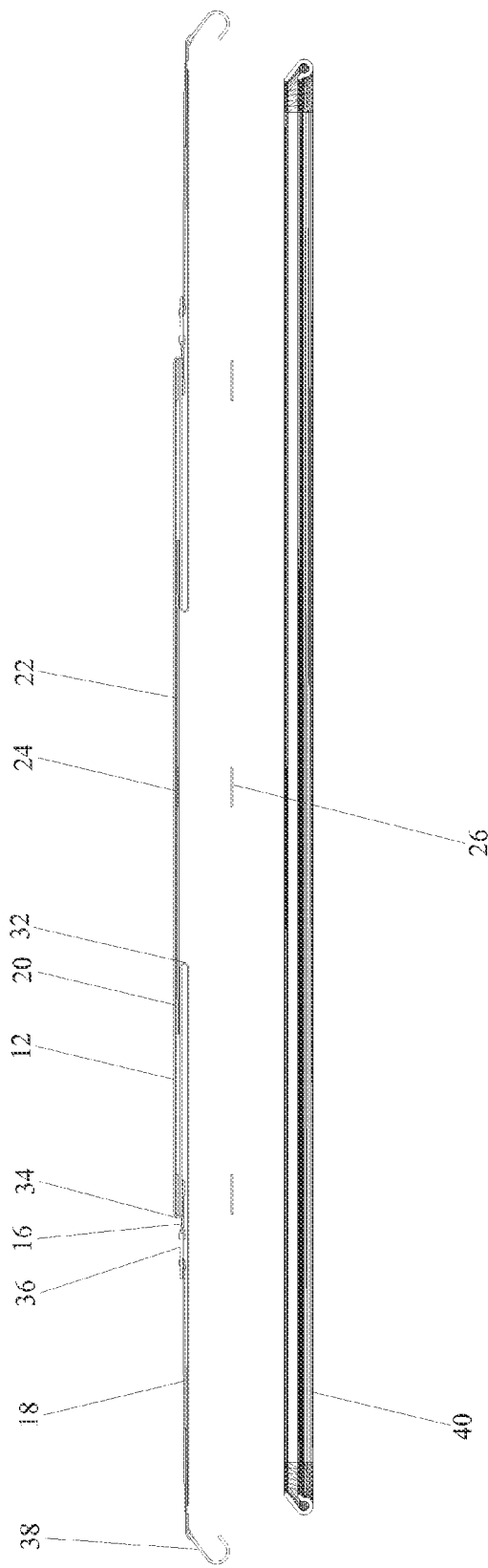
FIG. 14 shows a latitudinal side view of the tonneau cover folds without the friction fit seal attached.

Referring now to FIGS. 13 and 14, there is illustrated a longitudinal cross section and latitudinal cross section of the collapsed flexible cover 12 without the support of the bows 68. The friction fit seal 40 is shown detached for clarity. When cargo is not present, the longitudinal elastic tightening straps 26 and the latitudinal elastic tightening straps 22 self-tension and pull the flexible cover 12 to a flat and tight position. The internal latitudinal folds 28, external latitudinal folds 30, internal longitudinal folds 32 and external longitudinal folds 34 may allow the excess flexible cover 12 to be taken up and lay flat.

Figure 15:
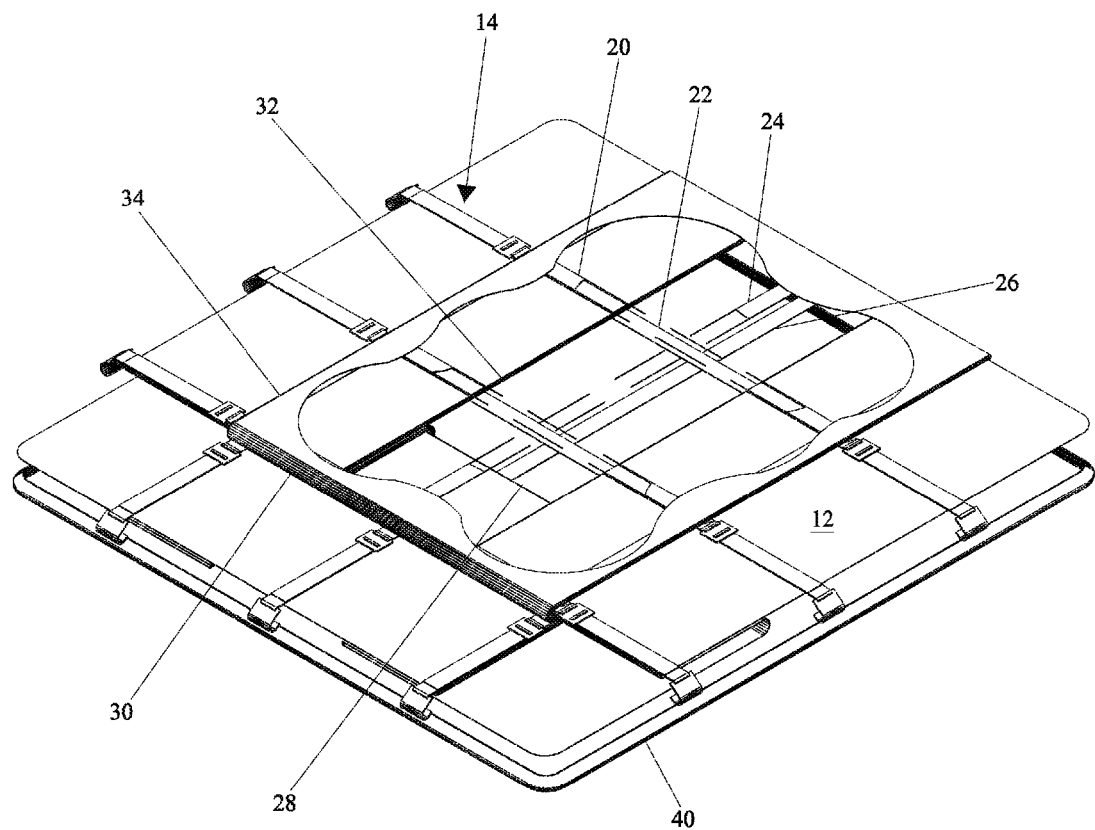
FIG. 15 shows an isometric view of the flat tonneau cover with internal parts exposed and without the friction fit seal attached.

Referring now to FIG. 15, there is illustrated the collapsed flexible cover 12 without the support of the bows 68. The friction fit seal 40 is shown detached for clarity. The internal parts are exposed for clarity.

Figure 16:
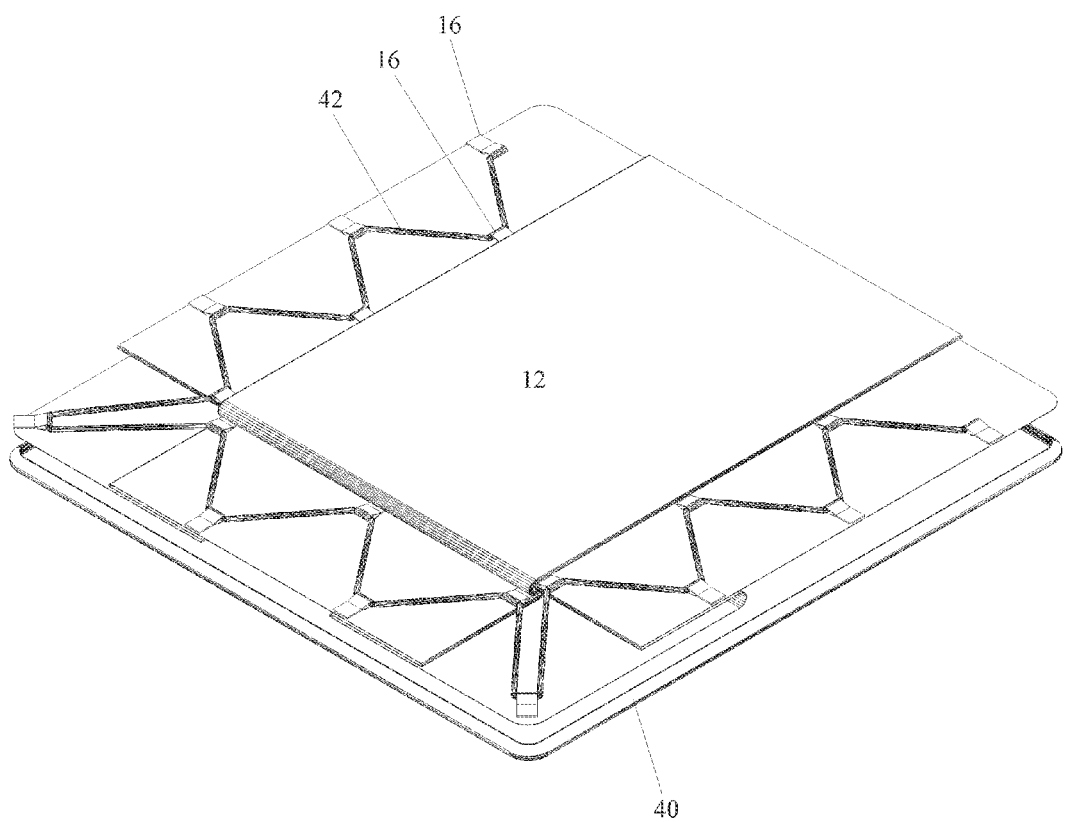
FIG. 16 shows an isometric view of the flat tonneau cover with an alternative method of strapping and without the friction fit seal attached.
Figure 17:
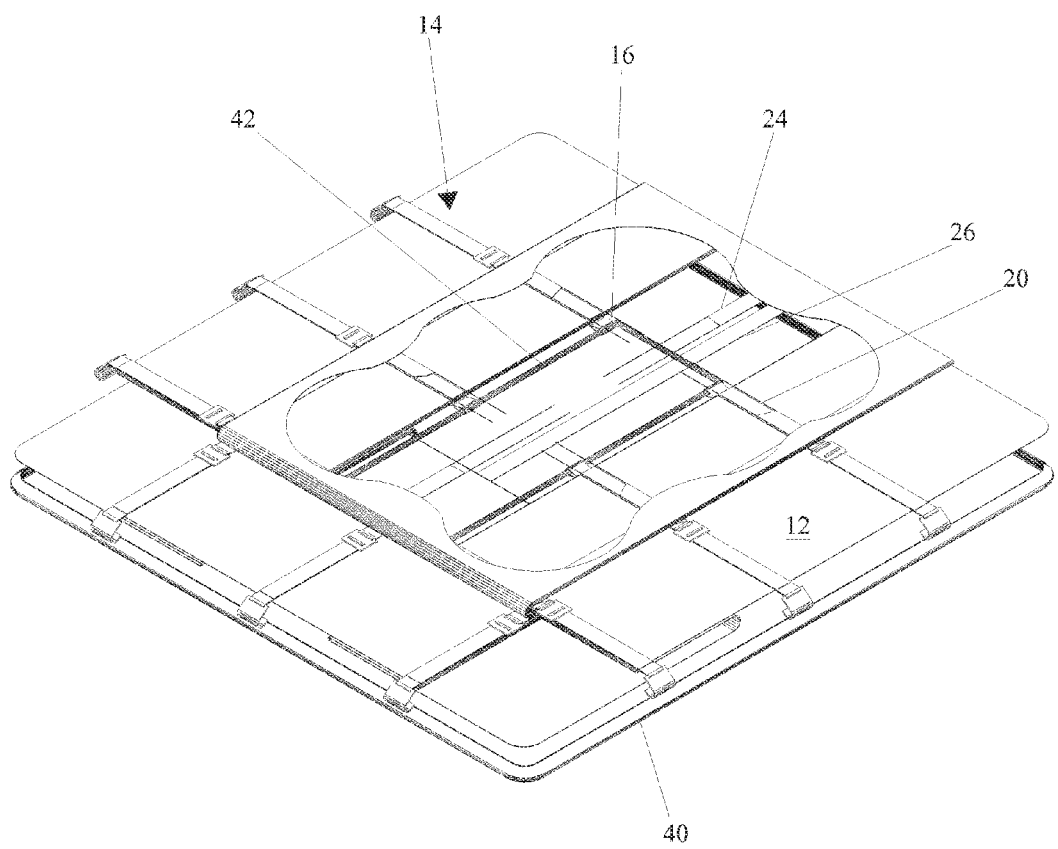
FIG. 17 shows an isometric view of the flat tonneau cover with and alternative method of internal parts exposed and without the friction fit seal attached.
Figure 18:
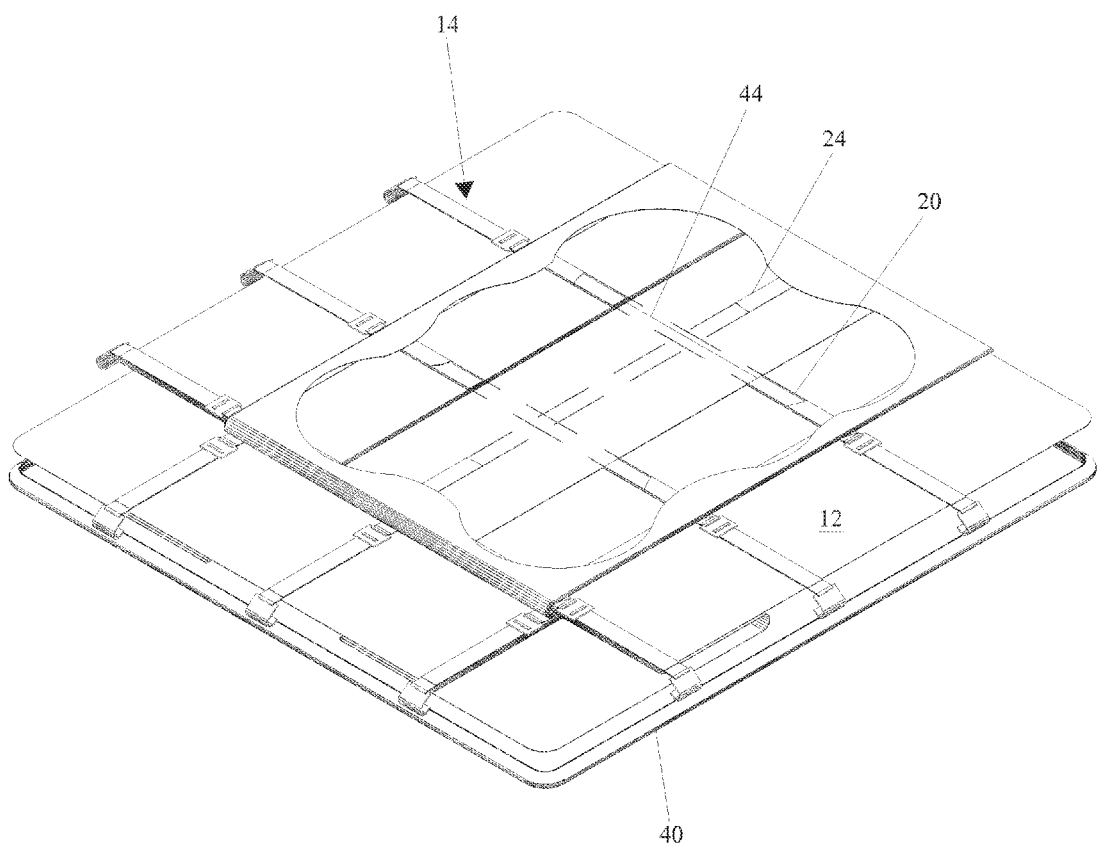
FIG. 18 shows an isometric view of the flat tonneau cover with and alternative method of internal parts exposed and without the friction fit seal attached.

Additional embodiments of the tonneau cover are illustrated in FIGS. 16-18. In particular, these figures show the collapsed flexible cover 12 without the support of the bows 68. The friction fit seal 40 is shown detached for clarity. These embodiments may incorporate cord 42 and/or elastic fabric 44 to self-tension the flexible cover 12.

It will be appreciated that the present invention can be utilized on a wide variety of vehicles, including pickup trucks, trailers, military vehicles, or any other type of vehicle with an exposed cargo space. In an embodiment, the flexible cover may be constructed from a vinyl, reinforced polyester, coated fabric, or a cotton material.

It will be appreciated that the structure and apparatus disclosed herein is merely one example of a means for expanding a tonneau cover, and it should be appreciated that any structure, apparatus or system for expanding a tonneau cover which performs functions the same as, or equivalent to, those disclosed herein are intended to fall within the scope of a means for expanding a tonneau cover, including those structures, apparatus or systems for expanding a tonneau cover which are presently known, or which may become available in the future. Anything which functions the same as, or equivalently to, a means for expanding a tonneau cover falls within the scope of this element.

Those having ordinary skill in the relevant art will appreciate the advantages provide by the features of the present disclosure. For example, it is a feature of the present disclosure to provide a tonneau cover that is operable between a collapsed position and an expanded position. It is further a feature of the present disclosure to provide tonneau cover with a plurality of folds. It is further a feature to provide a tonneau cover with self-retracting means.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A tonneau cover system mountable to a cargo area of a vehicle, the cargo area defined by vehicle sidewalls and having a longitudinal axis and a latitudinal axis, said system comprising:
    a main support frame;
    a flexible cover secured about its perimeter to the main support frame;
    the flexible cover having a first Z-shaped fold, the first Z-shaped fold defining an upper fold and a lower fold;
    a first tensioning member connected to the flexible cover and tensioning the upper fold in a first direction;

a second tensioning member connected to the flexible cover and tensioning the lower fold in a second direction, wherein the first direction is opposite the second direction; and the flexible cover being operable between a collapsed position and an expanded position over the cargo area;

wherein the first Z-shaped fold is folded when the flexible cover is in the collapsed position;

wherein the first Z-shaped fold is at least partially unfolded when the flexible cover is in the expanded position.

2. The system of claim 1, wherein the main support frame comprises a first pair of oppositely disposed rails and a second pair of oppositely disposed rails.

3. The system of claim 1, wherein the first Z-shaped fold is parallel to the longitudinal axis.

4. The system of claim 1, wherein the first Z-shaped fold is perpendicular to the longitudinal axis.

5. The system of claim 1, further comprising:
a second Z-shaped fold, the second Z-shaped fold defining an upper fold and a lower fold;
a third tensioning member connected to the flexible cover and tensioning the upper fold of the second Z-shaped fold in a first direction; and
a fourth tensioning member connected to the flexible cover and tensioning the lower fold of the second Z-shaped fold in a second direction, wherein the first direction is opposite the second direction.

6. The system of claim 5,
wherein the flexible cover further comprises a left panel portion, a middle panel portion, and a right panel portion;
wherein the middle panel portion is interposed between the left panel portion and the right panel portion;
wherein the left panel portion extends between the lower fold of the first Z-shaped portion and the main support frame;
wherein the middle panel portion extends between the upper fold of the first Z-shaped fold and the upper fold of the second Z-shaped fold; and
wherein the right panel portion extends between the lower fold of the second Z-shaped fold and the main support frame;
wherein the middle panel portion is disposed above both the left panel portion and the right panel portion.

7. The system of claim 1, further comprising at least one wherein elastic member attached to the flexible cover to self-retract the flexible cover from the expanded position to the collapsed position.

8. The system of claim 1, further comprising at least one tensioning member attached to the flexible cover for securing cargo in the cargo area.

9. A method of covering a cargo area of a vehicle, the cargo area defined by vehicle sidewalls and having a longitudinal axis and a latitudinal axis, said method comprising:
securing a main support frame to the vehicle; and
securing a flexible cover to the main support frame;
wherein the flexible cover comprises at least one Z-shaped fold such that the flexible is operable between a collapsed position and an expanded position over the cargo area;
wherein the at least one Z-shaped fold of the flexible cover is folded in the collapsed position;
wherein the at least one Z-shaped fold of the flexible cover is at least partially unfolded in the expanded position;
wherein the at least one Z-shaped fold defines a first fold and a second fold;

wherein the flexible cover further comprises a first tensioning member for tensioning the first fold in a first direction and a second tensioning member for tensioning the second fold in a second direction, wherein the first direction is opposite the second direction.

10. The method of claim 9, wherein the main support frame comprises a first pair of oppositely disposed rails and a second pair of oppositely disposed rails.

11. The method of claim 9, wherein the at least one Z-shaped fold is parallel to the longitudinal axis.

12. The method of claim 9, wherein the at least one Z-shaped fold is perpendicular to the longitudinal axis.

13. The method of claim 9, wherein the at least one Z-shaped fold further comprises a pair of spaced apart, longitudinal Z-shaped folds.

14. The method of claim 13, wherein the at least one Z-shaped fold further comprises a latitudinal Z-shaped fold.

15. The method of claim 9, further comprising at least one elastic member attached to the flexible cover to self-retract the flexible cover from the expanded position to the collapsed position.

16. The method of claim 9, further comprising at least one tensioning member attached to the flexible cover for securing cargo in the cargo area.

17. A tonneau cover system mountable to a cargo area of a vehicle, the cargo area defined by vehicle sidewalls and having a longitudinal axis and a latitudinal axis, said system comprising:
a main support frame; and
a flexible cover secured to the main support frame;
wherein the flexible cover includes a means for expanding to cover a load taller than the sidewalls of the cargo area;
wherein the means for expanding comprises a pair of spaced apart, longitudinally extending Z-shaped folds;
wherein each of the Z-shaped folds comprises a first fold and a second fold;
wherein the means for expanding further comprises a first tension member for tensioning the first fold in a first direction and a second tensioning member for tensioning the second fold in a second direction, wherein the first direction is opposite the second direction.

18. The system of claim 17, wherein the flexible cover further comprises a means for self-retraction.

19. The system of claim 17, further comprising a tensioning means for securing cargo in the cargo area of the vehicle.

20. The system of claim 17, wherein the means for expanding comprises at least one fold in the flexible cover.

21. A tonneau cover system mountable to a cargo area of a vehicle, the cargo area defined by vehicle sidewalls and having a longitudinal axis and a latitudinal axis, said system comprising:
a main support frame;
a flexible cover secured about its perimeter to the main support frame;
the flexible cover having a first Z-shaped fold, a second z-shaped fold, and a third Z-shaped fold;
wherein the first Z-shaped fold and the second Z-shaped fold extend parallel to each other;
wherein the third Z-shaped fold extends crossways to the first Z-shaped fold and the second Z-shaped fold;
the first Z-shaped fold defining an external fold and an internal fold;
the second Z-shaped fold defining an external fold and an internal fold;
the third Z-shaped fold defining an external fold and an internal fold;

wherein the internal fold of the first Z-shaped fold and the internal fold of the second Z-shaped fold define a gap between them;

a first tensioning member connected to the flexible cover and tensioning the external fold of the first Z-shaped fold;

a second tensioning member connected to the flexible cover and tensioning the external fold of the second Z-shaped fold;

a third tensioning member connected to the flexible cover and tensioning the internal fold of the first Z-shaped and the internal fold of the second-Z-shaped member;

the flexible cover further comprising a left panel portion, a middle panel portion, and a right panel portion;

wherein the middle panel portion is interposed between the left panel portion and the right panel portion;

wherein the left panel portion extends between the internal fold of the first Z-shaped fold and the main support frame;

wherein the right panel portion extends between the internal fold of the second Z-shaped fold and the main support frame;

wherein the middle panel portion extends between the external fold of the first Z-shaped fold and the external fold of the second Z-shaped fold;

wherein the middle panel portion is disposed above both the left panel portion and the right panel portion;

wherein the middle panel portion extends over the gap formed between the internal fold of the first Z-shaped fold and the internal fold of the second Z-shaped fold;

a fourth tensioning member connected to the flexible cover and tensioning the external fold of the third Z-shaped fold;

a fifth tensioning member connected to the flexible cover and tensioning the internal fold of the third Z-shaped fold;

the flexible cover being operable between a collapsed position and an expanded position over the cargo area;

wherein the first Z-shaped fold, the second Z-shaped fold, and the third Z-shaped fold are folded when the flexible cover is in the collapsed position;

wherein the first Z-shaped fold, the second Z-shaped fold, and the third Z-shaped fold are at least partially unfolded when the flexible cover is in the expanded position.

\* \* \* \* \*